United States Patent [19]

Walker

[11] 4,231,040

[45] Oct. 28, 1980

[54] SIMULTANEOUS MULTIPLE BEAM ANTENNA ARRAY MATRIX AND METHOD THEREOF

[75] Inventor: Scott H. Walker, Scottsdale, Ariz.

[73] Assignee: Motorola, Inc., Schaumburg, Ill.

[21] Appl. No.: 968,583

[22] Filed: Dec. 11, 1978

[51] Int. Cl.[3] ........................................ H04B 7/00

[52] U.S. Cl. ........................ 343/100 SA; 343/854

[58] Field of Search .................... 343/100 SA, 854

[56] References Cited

U.S. PATENT DOCUMENTS

| | | | |
|---|---|---|---|
| 3,255,450 | 6/1966 | Butler | 343/100 SA |
| 3,295,134 | 12/1966 | Lowe | 343/100 SA |
| 3,997,900 | 12/1976 | Chin et al. | 343/854 |

*Primary Examiner*—Theodore M. Blum

*Attorney, Agent, or Firm*—Eugene A. Parsons

[57] ABSTRACT

Apparatus and method for adjusting the position of radiated beams from a Butler matrix and combining portions of adjacent beams to provide resultant beams having an amplitude taper resulting in a predetermined amplitude of side lobes with a maximization of efficiency.

13 Claims, 10 Drawing Figures

SIMULTANEOUS MULTIPLE BEAM ANTENNA ARRAY MATRIX AND METHOD THEREOF

BACKGROUND OF THE INVENTION

The prior art utilizes a Butler matrix to form multiple antenna beams. However, in many applications this is undesirable since the Butler matrix does not provide an amplitude taper required for low side lobes and lossy elements must be utilized to reduce the side lobes, which results in a substantial loss of power. One method of lowering the side lobes is to combine adjacent beams which will yield a cosine illumination (see Hansen, RC; "Microwave Scanning Antennas," Academic Press, 1966, Volume III, pp. 258-268). This method works well for a switched beam array but, unfortunately, two adjacent cosine beams cannot be formed simultaneously without considerable (approximately 3 dB) power loss, as can be shown from the conservation of power principle. Further, a Butler matrix for the simultaneous formation of multiple beams can only be used for a binary number of elements ($2^n$). Shelton and Kelleher show that other numbers of elements are theoretically possible including all values of $3^m \cdot 2^n$ through the use of a six port junction (Shelton, J. P. and Kelleher, K. S.; "Multiple Beams From Linear Arrays," IRE Transactions on Antennas and Propagation, March 1961, pp. 154-161). It is believed that no such junction has been attempted to date but that it is possible to construct such a junction through the use of three parallel lines. However, such a construction is relatively complicated and expensive.

SUMMARY OF THE INVENTION

The present invention pertains to an antenna array matrix for simultaneously providing multiple beams including a Butler matrix having at least three inputs ports and at least three output ports with phase shifting means connected to the output ports for introducing a phase shift in a fixed phase progression of approximately 180° divided by the number of output ports and an additional row of quadrature couplers for combining the input ports to provide resultant output beams that have an amplitude taper resulting in a predetermined amplitude of side lobes with approximately a maximization of efficiency.

Further, the invention pertains to a method of maximizing the efficiency for a predetermined side lobe level in a simultaneous multiple beam antenna array matrix including a Butler matrix having at least three input ports and at least three output ports, the method including shifting the phases of signals at the output ports in a fixed phase progression of approximately 180° divided by the number of output ports to locate one multiple beam approximately along the array axis and combining portions of the one beam with each adjacent beam to produce resultant adjacent beams with an amplitude taper having a predetermined amplitude of side lobe and approximately maximizing the efficiency.

It is an object of the present invention to provide a new and improved simultaneous multiple beam antenna array matrix with an amplitude taper providing a predetermined amplitude of side lobe and approximately maximizing the efficiency.

It is a further object of the present invention to provide a practical realization of a six port junction.

It is a further object of the present invention to provide a new and improved simultaneous multiple beam antenna array matrix including a six port junction.

It is a further object of the present invention to provide a method of maximizing the efficiency for a predetermined side lobe level in a simultaneous multiple beam antenna array matrix.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
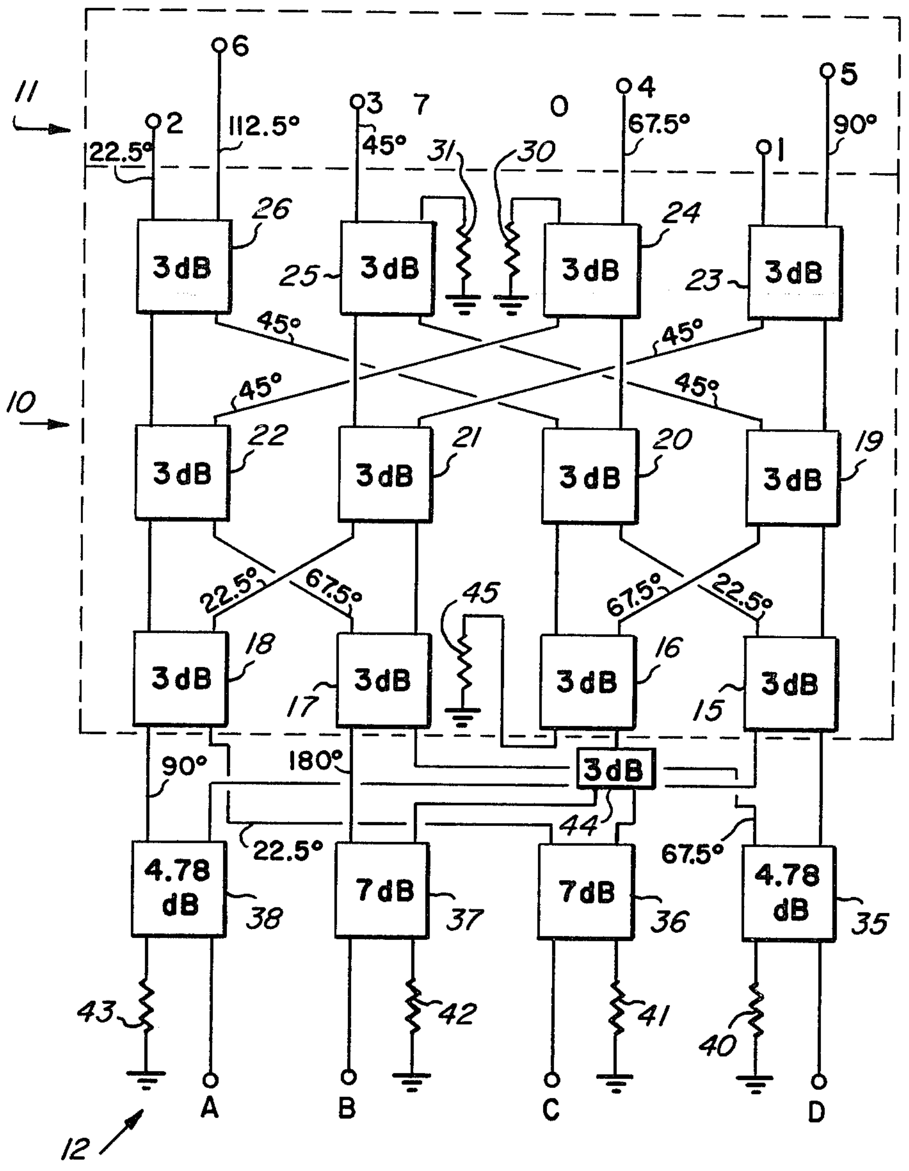
FIG. 1 is a block diagram of a simultaneous multiple bea antenna array matrix embodying the present invention.

Referring specifically to FIG. 1, an antenna array matrix for simultaneously providing multiple beams, embodying the present invention, is illustrated. The matrix includes an eight port Butler matrix included within the dotted line box and generally designated 10, phase shifting apparatus, generally designated 11, connected to the output ports of the Butler matrix 10 and combining means, generally designated 12, for combining portions of adjacent beams as will be described in more detail presently. The Butler matrix 10 of the present embodiment is a three row, eight port Butler matrix, but it should be understood that substantially any number of ports, including all values of $3^m \cdot 2^n$ (where m and n are any positive whole number and either n or m may include zero) may be utilized. Each of the three rows includes four 3 dB couplers consecutively numbered 15 through 26. The 3 dB couplers utilized may be any quadrature coupler which supplies signals at the output ports that are 90° out of phase and power applied to either input port is split approximately equally between the two output ports.

The first row of couplers, 15 through 18, present eight input ports which serve as the eight input ports for the Butler matrix 10. The eight output ports of the couplers 15 through 18 are connected to the eight input ports of the couplers 19 through 22 of the second row in the following arrangement. A second output port of the coupler 15 is connected to a second input port of the coupler 19. A first output port of the coupler 15 is connected through a 22.5° phase shifting line to a second input port of the coupler 20. A second output port of the coupler 16 is connected through a 67.5° phase shifting line to a first input port of the coupler 19. A first output port of the coupler 16 is connected to a first input port of the coupler 20. A second output port of the coupler 17 is connected to a second input port of the coupler 21. A first output port of the coupler 17 is connected through a 67.5° phase shifting line to a second input port of the coupler 22. A second output port of the coupler 18 is connected through a 22.5° phase shifting line to a first input port of the coupler 21. A first output port of the coupler 18 is connected to a first input port of the coupler 22.

The eight output ports of the couplers 19 through 22 forming the second row are connected to the eight input ports of the couplers 23 through 26 forming the third row as follows. The second output port of the coupler 19 is connected to the second input port of the coupler 23. The first output port of the coupler 19 is connected through a 45° phase shifting line to the second input port of the coupler 25. The second output port of the coupler 20 is connected to the second input port of the coupler 24. The first output port of the coupler 20 is connected through a 45° phase shifting line to the second input port of the coupler 26. The second output port of the coupler 21 is connected through a 45° phase shifting line to the first input port of the coupler 23. The first output port of the coupler 21 is connected to the first input port of the coupler 25. The second output port of the coupler 22 is connected through a 45° phase shifting line to the first input port of the coupler 24. The first output port of the coupler 22 is connected to the first input port of the coupler 26. The eight output ports of the third row of couplers 23 through 26 serve as the eight output ports of the Butler matrix 10.

The eight port Butler matrix 10 of FIG. 1, when properly energized with input signals, produces phase progressions across the array from the eight input ports of ±22.5°, ±67.5°, ±112.5° and ±157.5°. Adjacent beams can be combined in the Butler matrix 10 to conserve power but the problem is that phase progressions of ±45° and ±135° results, which produces beams at ±14.48° and ±48.59° for $\lambda/2$ antenna element spacing and the beam width is too narrow with a resultant low beam crossover level. This phase progression can be changed and the beam width broadened for a 3 to 4 dB crossover level with only a minor loss in power, as follows. A fixed 22.5° phase progression is added at the output ports of the Butler matrix 10 which results in phase progressions of 0°, ±45°, ±90°, ±135° and 180°. The fixed 22.5° phase progression is added as follows. The first output port of the coupler 24 serves as a first output port of the improved matrix and is terminated in a load resistor 30. The first output port of the coupler 23 is connected directly to, or serves as, a second output terminal of the improved matrix. The first output port of the coupler 26 is connected through a 22.5° phase shifting line to a third output terminal of the improved matrix. The first output port of the coupler 25 is connected through a 45° phase shifting line to a fourth output terminal of the improved matrix. The second output port of the coupler 24 is connected through a 67.5° phase shifting line to a fifth output terminal of the improved matrix. The second output port of the coupler 23 is connected through a 90° phase shifting line to a sixth output terminal of the improved matrix. The second output port of the coupler 25 is terminated in a load resistor 31. To provide the fixed 22.5° progression across the entire matrix the second output port of the coupler 24 and the first output port of the coupler 25 should be connected through −22.5° and 135° phase shifting lines to output terminals 0 and 7. However, these two output ports have very little power thereon and are terminated in loads 30 and 31, respectively, with only the central six ports being used. While these two outside ports might be utilized if desired, the termination of these ports as illustrated, raises the crossover points between adjacent beams, eliminates the need for two additional antenna elements and has very little effect on the output power of the array. While a 22.5° fixed phase progression has been introduced in the embodiment disclosed, it should be understood that arrays with different numbers of ports will require a different fixed phase progression. In general, the fixed phase progression introduced in any array will be approximately 180° divided by the number of output ports. It will be recognized by those skilled in the art that the introduction of the fixed phase progression shifts the positions of the antenna beams so that one of the beams is situated along the axis of the antenna array.

By combining portions of the central beam with each of the adjacent beams the resultant beams are broadened for a 3 to 4 dB crossover level and the side lobes are at least 15 dB down. The combining means 12 includes a fourth row of couplers or power dividers 35 through 38, all of which are shown as four port quadrature couplers but could be any type of three or four port power divider. Couplers 35 and 38 are 4.78 dB couplers, which is a title indicating that power applied to either of the inputs is split approximately 2 to 1 at the outputs with the square root of 2 over the square root of 3 times the power input appearing at the output port directly opposite the input port receiving the power and 1 over the square root of 3 times the input power appearing at the diagonally located output terminal. Couplers 36 and 37 are 7 dB couplers, the title of which indicates that power applied to either input is split approximately 4 and 1 at the output terminals generally as described in conjunction with the 4.78 dB couplers. Because, as will be described presently, the beams are combined by the combining means 12 so that only four main lobes appear, only four input terminals of the array are utilized. The first input port of the coupler 35, the second input port of the coupler 36, the second input port of the coupler 37 and the first input port of the coupler 38 are all terminated in impedances 40 through 43, respectively. The remaining four input ports serve as input terminals for the matrix.

The second output port of the coupler 35 is connected to the second input port of the coupler 15. The first output port of the coupler 35 is connected through a 67.5° phase shifting line to the second input port of the coupler 17. The second output port of the coupler 36 is connected to one input port of a 3 dB coupler 44. The coupler 44 may be a three port device or may be similar to the 3 dB couplers previously described, with only one output port being utilized. The output port of the coupler 44 is connected to the second input port of the coupler 16. The first input port of the coupler 16 is terminated in an impedance 45 and is not utilized, as will be described presently. The first output port of the coupler 36 is connected through a 22.5° phase shifting line to the second input port of the coupler 18. The second output port of the coupler 37 is connected to the first input port of the 3 dB coupler 44. The first output port of the coupler 37 is connected through a 180° phase shifting line to the first input port of the coupler 17. The second output port of the coupler 38 is connected to the first input port of the coupler 15 and the first output port of the coupler 38 is connected through a 90° phase shifting line to the first input port of the coupler 18.

Figure 2:
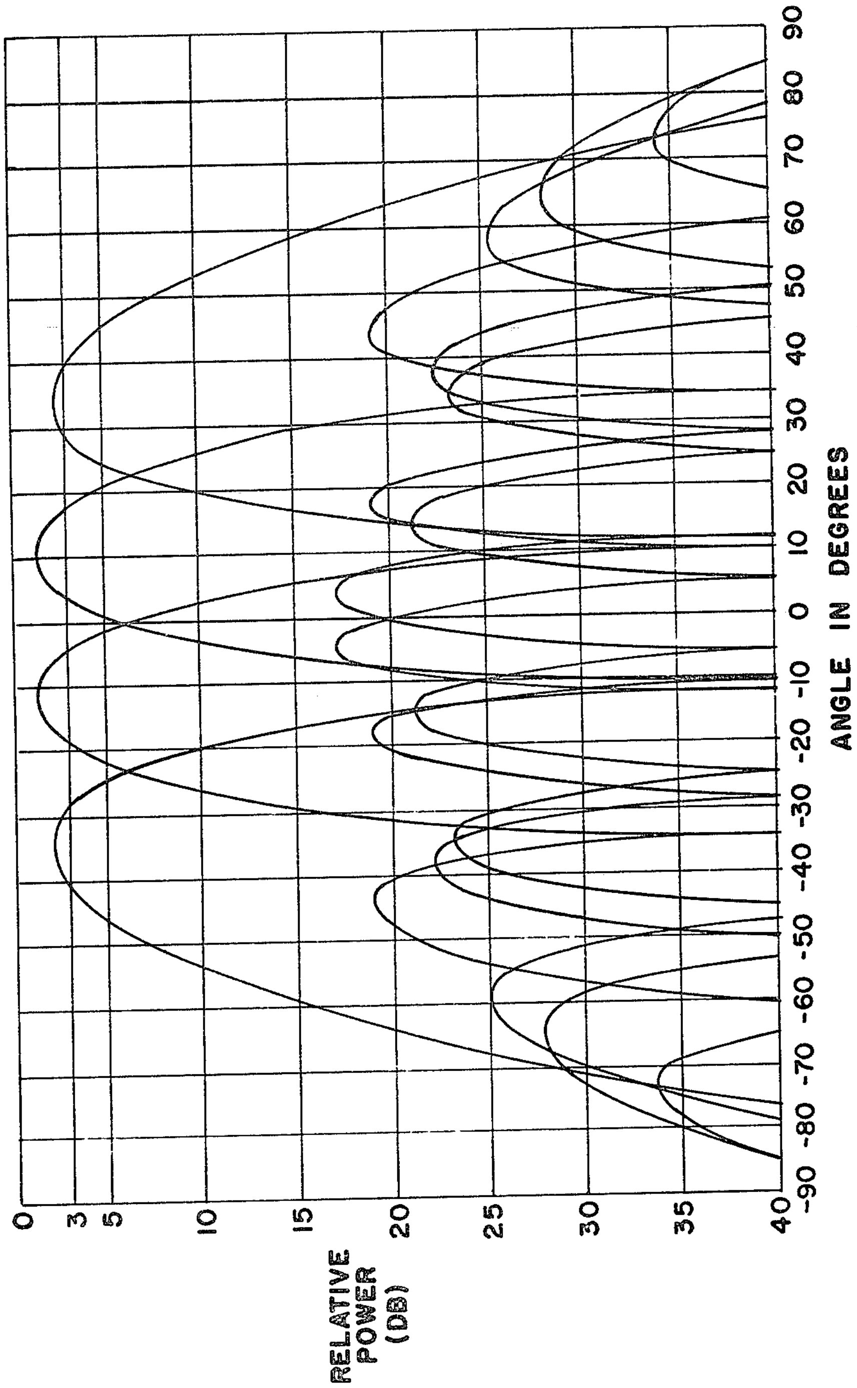
FIG. 2 is a graphical presentation of calculated patterns of output power for the apparatus of FIG. 1.
Figure 3:
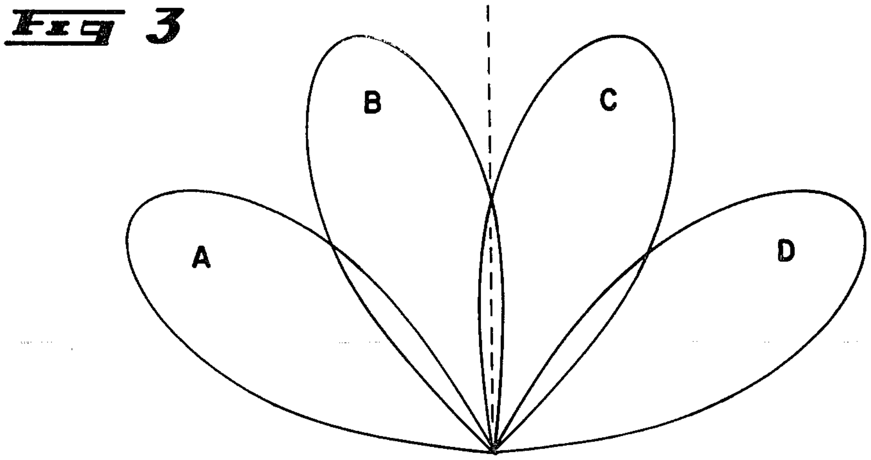
FIG. 3 is a simplified graph illustrating the directional radiation characteristics of the apparatus of FIG. 1.

The above described connections of the combining means 12, or the fourth row of couplers, results in the following beam combinations. The power to the 90° beam is twice as high as that to the 135° beam which results in a phase progression of approximately 105°. Similarly the power to the −90° beam is twice as high as that to the −135° beam which results in a phase progression of approximately −105°. Also, power fed to the 45° beam is nine times as much as that fed to the 0° beam so that a 35° beam results and, in a like manner, nine times as much power is applied to the −45° beam as is applied to the 0° beam so that a −35° beam results. The 180° beam is terminated by the impedance 45 so ±33.75° with λ/2 antenna element spacing is ±35° and ±100°), this embodiment does result in an amplitude taper providing a predetermined amplitude of side lobe (less than 15 dB down) and approximately maximizes the efficiency (less than 1 dB loss). The beams scanned nearest broadside (beams B and C of FIG. 3) lose approximately 0.95 dB of gain due mainly to power absorbed by the 3 dB coupler 44 connected to the 0° beam, but still have a gain greater than the other beams (beams A and D of FIG. 3). The pattern of FIG. 2 is calculated from the phase and amplitude data of Table 1.

TABLE 1

Figure 4:
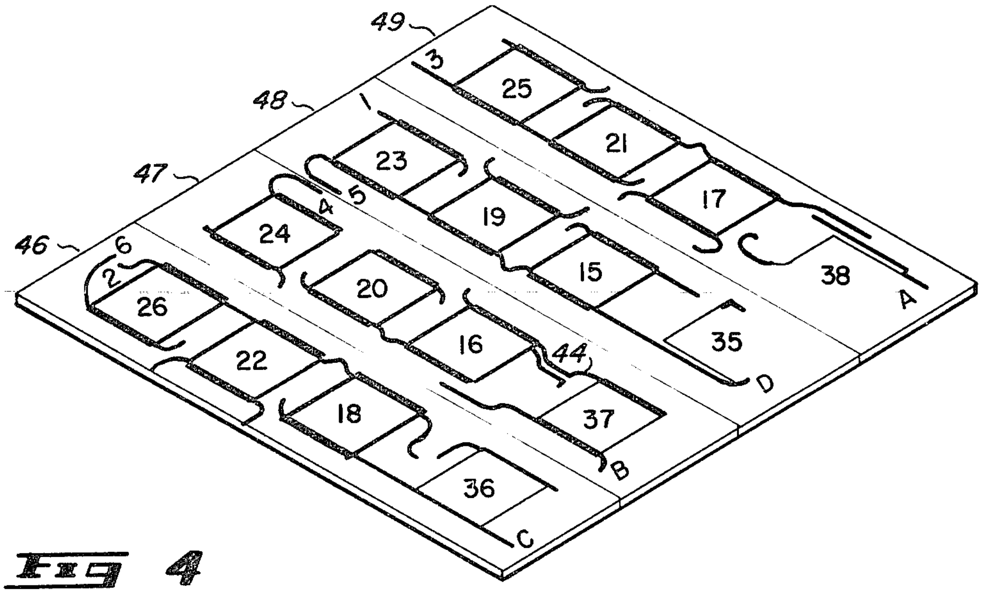
FIGS. 4, 5 and 6 illustrate the various layers of the apparatus of FIG. 1 formed in a stripline configuration, and the assembly thereof.
Figure 6:
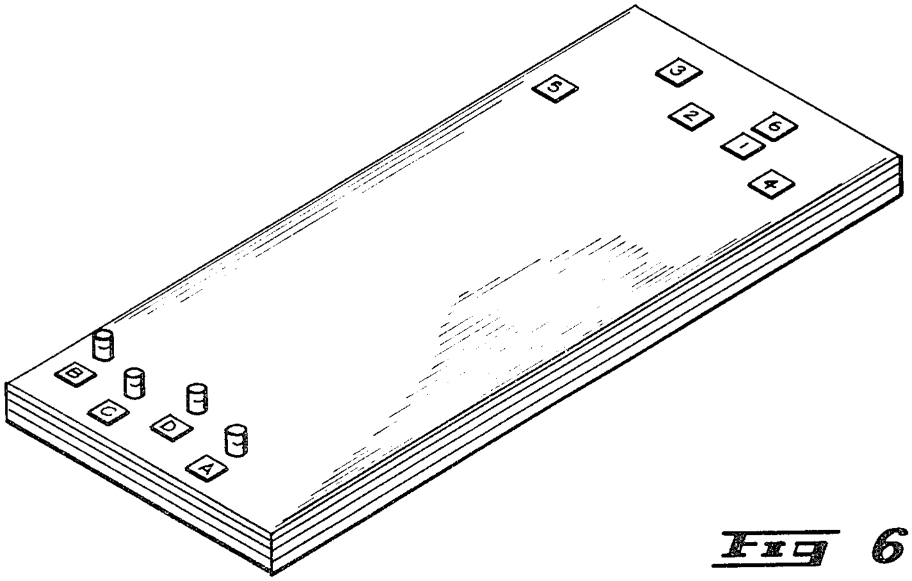
Figure 5:
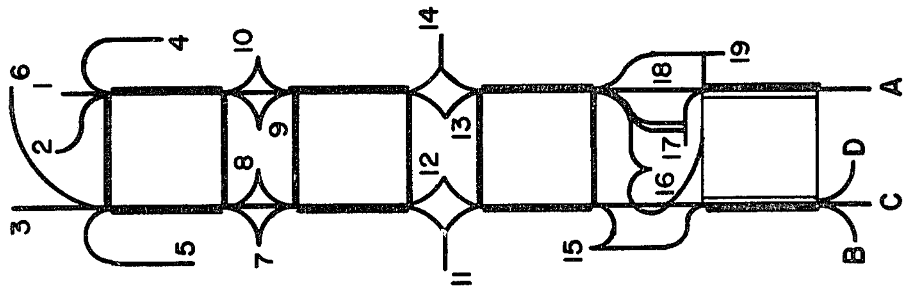

| Input Port | OUTPUT PORT | 1 | 2 | 3 | 4 | 5 | 6 | TOTAL |
|---|---|---|---|---|---|---|---|---|
| | Left Path | .290 ∠540 | .290 ∠630 | .290 ∠720 | .290 ∠450 | .290 ∠540 | .290 ∠630 | |
| | Right Path | .204 ∠787.5 | .204 ∠562.5 | .204 ∠697.5 | .204 ∠830.5 | .204 ∠967.5 | .204 ∠742.5 | |
| A | Summation | .284 ∠138.4 | .414 ∠242.8 | .485 ∠350.7 | .485 ∠459.3 | .414 ∠567 | .284 ∠671.6 | |
| | Power | .081 | .171 | .235 | .235 | .171 | .081 | .974 |
| | DB From Input | −10.93 | −7.66 | −6.29 | −6.29 | −7.66 | −10.93 | −.11dB |
| | Phase Δ | 86 | 104.4 | 107.9 | 108.6 | 107.8 | 104.5 | 86 |
| | Left Path | .112 ∠787.5 | .112 ∠787.5 | .112 ∠787.5 | .112 ∠787.5 | .112 ∠787.5 | .112 ∠787.5 | |
| | Right Path | .316 ∠675 | .316 ∠720 | .316 ∠765 | .316 ∠810 | .316 ∠855 | .316 ∠900 | |
| B | Summation | .292 ∠335.7 | .373 ∠376.1 | .422 ∠410.8 | .422 ∠444.2 | .373 ∠478.9 | .292 ∠519.2 | |
| | Power | .085 | .139 | .178 | .178 | .139 | .085 | .804 |
| | DB From Input | −10.69 | −8.57 | −7.49 | −7.49 | −8.57 | −10.69 | −.947dB |
| | Phase Δ | 54.3 | 40.4 | 34.7 | 33.4 | 34.7 | 40.4 | 54.3 |
| | Left Path | .112 ∠787.5 | .112 ∠787.5 | .112 ∠787.5 | .112 ∠787.5 | .112 ∠787.5 | .112 ∠787.5 | |
| | Right Path | .316 ∠540 | .316 ∠495 | .316 ∠450 | .316 ∠765 | .316 ∠720 | .316 ∠675 | |
| C | Summation | .292 ∠519.2 | .373 ∠478.9 | .422 ∠444.2 | .422 ∠410.8 | .373 ∠376.1 | .292 ∠335.7 | |
| | Power | .085 | .139 | .178 | .178 | .139 | .085 | .804 |
| | DB From Input | −10.69 | −8.57 | −7.49 | −7.49 | −8.57 | −10.69 | −.947dB. |
| | Phase Δ | 54.3 | −40.4 | −34.7 | −33.4 | −34.7 | −40.4 | 54.3 |
| | Left Path | .204 ∠562.5 | .204 ∠787.5 | .204 ∠652.5 | .204 ∠877.5 | .204 ∠742.5 | .204 ∠967.5 | |
| | Right Path | .290 ∠450 | .290 ∠720 | .290 ∠630 | .290 ∠540 | .290 ∠450 | .290 ∠720 | |
| D | Summation | .284 ∠851.6 | .414 ∠747.1 | .485 ∠639.3 | .485 ∠530.7 | .414 ∠422.9 | .284 ∠318.4 | |
| | Power | .081 | .171 | .235 | .235 | .171 | .081 | .974 |
| | DB From Input | −10.93 | −7.66 | −6.29 | −6.29 | −7.66 | −10.93 | −.11dB |
| | Phase Δ | 86 | −104.5 | −107.8 | −108.5 | −107.8 | −104.5 | 86 |

that it is not utilized. Thus, phase progressions of ±35° and ±105° are obtained which result in beam positions of approximately ±11.25° and ±33.75° with λ/2 antenna element spacing. Because the 0° beam is shared between the ±45° beams, there is a resultant loss of efficiency but the small amount of the 0° beam used limits the loss to less than 1 dB. Since the beams scanned to the largest angles (see beams A and D of FIG. 3) have a scanning gain loss of greater than this value, the added loss of the near in beams (beams B and C of FIG. 3) is really inconsequential and the resultant gain is actually more uniform with scan. Resultant phase and amplitude distributions produced by the combination of portions of the central, or 0° positioned beam, in the combining means 12 is set forth in Table 1. As can be seen from this table, the beams scanned the farthest (beams A and D of FIG. 3) lose only 0.11 dB, which goes to the loads 30 and 31 on the unused ports. While the amplitude taper is not a cosine taper, because the power division between the combined beams is not equal and the outside elements are not used, and the phase progression is not exactly as desired (phase progression required for beams at exactly ±11.25° and FIGS. 4, 5 and 6 illustrate the construction of the matrix of FIG. 1 in a typical stripline four layer assembly. The four layers 46, 47, 48 and 49 of the assembly are illustrated individually in FIG. 4 with the stacked circuitry being illustrated in FIG. 5. The layer 46 includes branch line couplers 26, 22, 18 and three port power divider 36. The layer 47 includes branch line couplers 24, 20, 16, three port power divider 37 and three port power divider 44. The layer 48 includes branch line couplers 23, 19, 15 and three port power divider 35. The layer 49 includes branch line couplers 25, 21, 17 and three port power divider 38. FIG. 6 illustrates the completely assembled structure with the various terminals identified thereon. Since this method of producing the matrices and matrices produced in this fashion are well known in the art, no further details will be explained herein.

Figure 7:
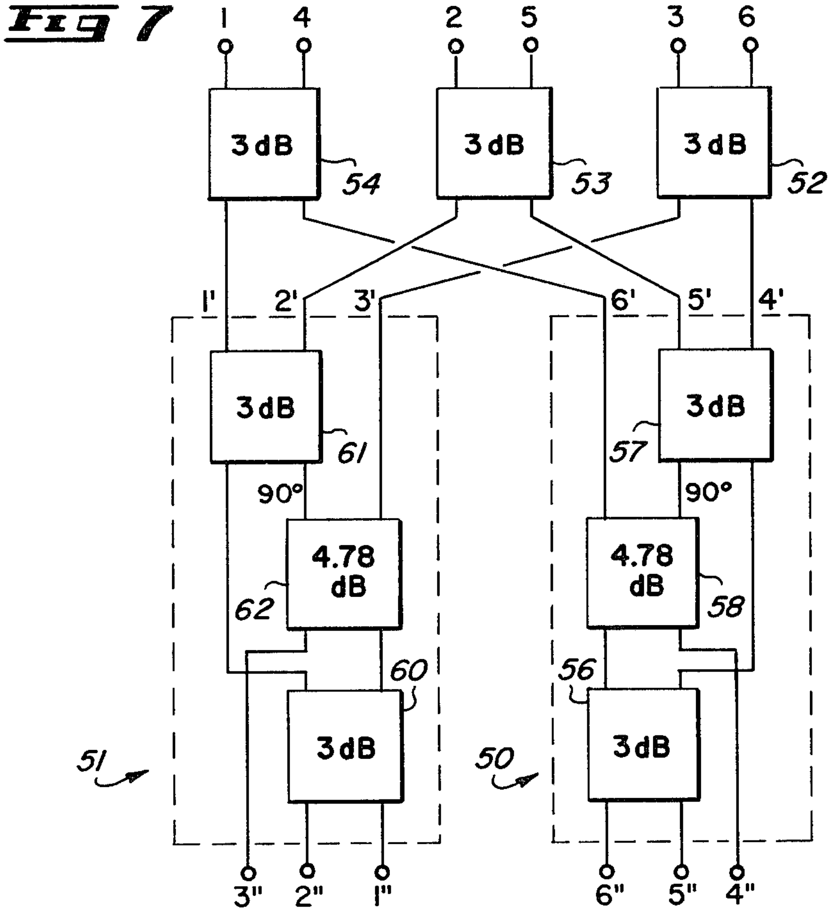
FIG. 7 is a block diagram of a modified Butler matrix using branch line couplers.

Referring specifically to FIG. 7, a modified Butler matrix having six ports is disclosed. Normally, a Butler matrix for the simultaneous formation of multiple beams can only be used for a binary number of elements ($2^n$). However, by utitlizing the apparatus of FIG. 7 and the method implicit therein, Butler matrices including all values of $3^m \cdot 2^n$ can be formed. The six port Butler matrix of FIG. 7 includes first and second six port junctions, generally designated 50 and 51 respectively, and a row of three 3 dB couplers 52 through 54. The six port junction 50 includes first and second 3 dB couplers 56 and 57, and a 4.78 dB coupler 58. The two inputs to the first 3 dB coupler 56 and the second input to the 4.78 dB coupler 58 form three inputs for the six port junction. The first output of the 4.78 dB coupler 58 and the two outputs of the 3 dB coupler 57 form the three output ports of the six port junction 50. The first output of the coupler 56 is connected to the first input of the coupler 58 and the second output of the coupler 56 is connected to the second input of the coupler 57. The first output of the coupler 58 is connected to the first input of the coupler 54 and the second output of the coupler 58 is connected to the first input of the coupler 57 through a 90° phase shifting line. The first output of the coupler 57 is connected to the second input of the coupler 53 and the second output of the coupler 57 is connected to the second input of the coupler 52.

In a similar fashion the six port junction 51 includes a first 3 dB coupler 60, a second 3 dB coupler 61 and a 4.78 dB coupler 62. The internal connections of the six port junction 51 are similar to the connections of the six port junction 50. The second output of the coupler 62 is connected to the first input of the coupler 52. The first output of the coupler 61 is connected to the first input of the coupler 54 and the second output of the coupler 61 is connected to the first input of the coupler 53. The six output terminals of the couplers 52, 53 and 54 form the six output ports of the six port Butler matrix.

TABLE 2

| | OUT PORT 1' WITH 60° ADDED | OUT PORT 2' WITH 30° ADDED | OUT PORT 3' | PHASE PROGRESSION |
|---|---|---|---|---|
| IN PORT 1" | $.5\angle 330^\circ + .288\angle 600^\circ$ | $.5\angle 390^\circ + .288\angle 480^\circ$ | $.577\angle 180^\circ$ | +120° |
| | $= .577\angle -60^\circ$ | $= .577\angle 60^\circ$ | $= .577\angle 180^\circ$ | |
| IN PORT 2" | $.5\angle 240^\circ + .288\angle 690^\circ$ | $.5\angle 300^\circ + .288\angle 570^\circ$ | $.577\angle 270^\circ$ | 0° |
| | $= .577\angle -90^\circ$ | $= .577\angle -90^\circ$ | $= .577\angle -90^\circ$ | |
| IN PORT 3" | $.577\angle 420^\circ$ | $.577\angle 300^\circ$ | $.577\angle 180^\circ$ | −120° |
| | $= .577\angle 60^\circ$ | $= .577\angle -60^\circ$ | $= .577\angle 180^\circ$ | |

TABLE 3

| | PHASE AT OUTPUT PORT NUMBER 1 | 2 | 3 | 4 | 5 | 6 | PHASE PROGRESSION |
|---|---|---|---|---|---|---|---|
| IN PORT 1" | −30° | 120° | 270° | 60° | 210° | 360° | +150° |
| IN PORT 2" | −60° | −30° | 0° | 30° | 60° | 90° | +30° |
| IN PORT 3" | 90° | 0° | 270° | 180° | 90° | 0° | −90° |
| IN PORT 4" | 0° | 90° | 180° | 270° | 0° | 90° | +90° |
| IN PORT 5" | 90° | 60° | 30° | 0° | −30° | −60° | −30° |
| IN PORT 6" | 360° | 210° | 60° | 270° | 120° | −30° | −150° |

Figure 10:
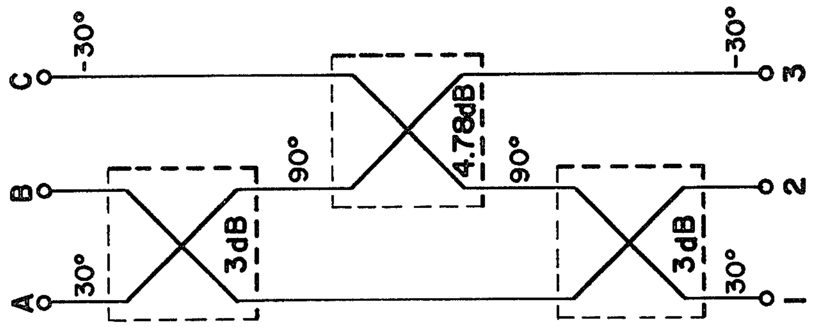
FIGS. 8, 9 and 10 illustrate different embodiments of a six port junction.
Figure 9:
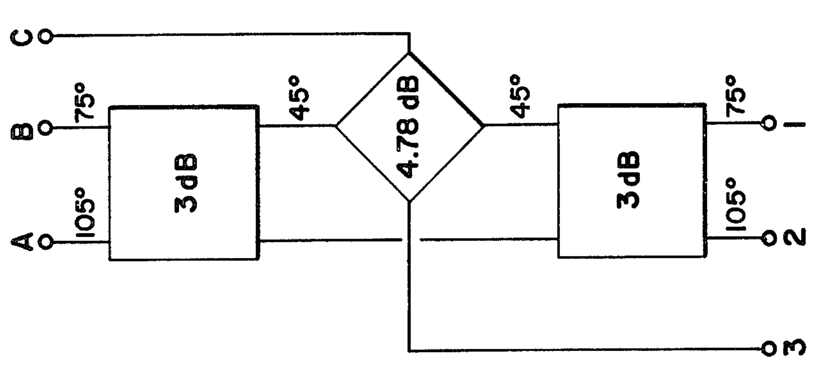
Figure 8:
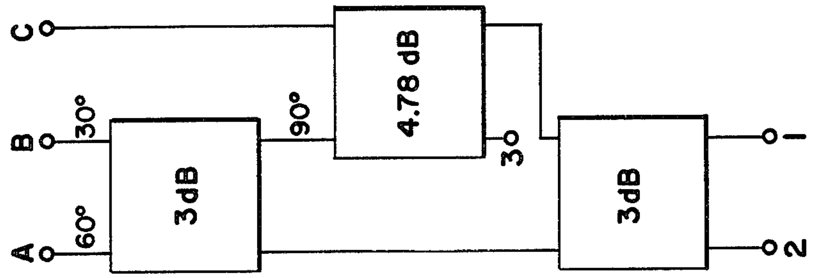

The amplitude and phase relationships of the input and output ports for the six port junction 50 in FIG. 7 are set forth in Table 2. The six port junctions 50 and 51 of FIG. 7, if constructed as individual units, would include the 60° and 30° phase shifting lines at the first and second output ports of the 3 dB couplers 57 and 61 respectively as illustrated in FIG. 8. However, in coupling these output ports to the last row of couplers 52, 53 and 54 the phase shifts in all lines is equal and, therefore, can simply be dropped. Two other possible embodiments for the six port junction are illustrated in FIGS. 9 and 10. Both of these embodiments are bilateral, i.e., either set of terminals can be used as the input ports or output ports and the junction produces the same result. The couplers of FIG. 10 are specifically illustrated in parallel line quadrature couplers which operate the same as previously described for 3 dB and 4.78 dB couplers but are simpler to connect and require less phase shift, as can be seen from a comparison of FIGS. 9 and 10. While negative phase shifting lines, or other specific phase shifts, may be specified throughout this disclosure, it will be understood by those skilled in the art that these are relative amounts and any actual phase shift may be utilized which will result in the relative amounts specified. Further, other phase shifting lines may be utilized to connect the two 3 dB and one 4.78 dB couplers to provide the desired result and it should be understood that the three embodiments illustrated are by way of example. The use of two such six port junctions to form the six port Butler matrix of FIG. 7 yields the amplitude and phase relationships set forth in Table 3. The six port Butler matrix illustrated in FIG. 7 will produce uniform amplitude distribution and relatively high side lobes in conjunction with an antenna array for simultaneously providing multiple beams. However, by applying the beam shifting and adjacent beam combining techniques set forth in conjunction with the specific embodiment of FIG. 1, amplitude taper can be introduced which will provide a predetermined amplitude of side lobe while approximately maximizing the efficiency.

Thus, specific embodiments of matrices and method utilized therein have been disclosed which extend the use of the Butler matrix by providing amplitude tapering for low side lobes while maintaining high efficiency and multiple simultaneous beams. In general, the side lobes can be reduced to at least 15 dB while maintaining the power loss at approximately 1 dB or less. While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:

1. In a simultaneous multiple beam antenna array matrix including a Butler matrix having $3^m \cdot 2^n$ input ports and $3^m \cdot 2^n$ output ports, where m and n are any whole positive integer either of which may include zero, a method of maximizing the power output for a predetermined side lobe level comprising the steps of:

(a) shifting the phases of signals at the $3^m \cdot 2^n$ output ports in a fixed phase progression of approximately 180° divided by the number of output ports to locate one multiple beam approximately along the array axis; and (b) combining portions of the one beam with each adjacent beam to produce resultant adjacent beams with an amplitude taper providing a predetermined amplitude of side lobe and approximately maximizing the efficiency.

2. In a simultaneous multiple beam antenna array matrix including a Butler matrix having eight input ports and eight output ports, a method of maximizing the efficiency for a side lobe level at least 15 dB down comprising the steps of:

(a) shifting the phases of signals at the eight output ports in a fixed phase progression of approximately 22.5° to provide phase progressions of approximately 0°, ±45°, ±90°, ±135° and 180° at the eight output ports; and (b) combining inputs to alter the phase progressions to approximately ±35° and ±105°.

3. A method as claimed in claim 2 wherein the combining step includes supplying approximately twice as much power to the 90° beam as is applied to the 135° beam to provide a resultant phase progression of 105°, supplying approximately twice as much power to the −90° beam as is supplied to the −135° beam to provide a resultant phase progression of −105°, supplying approximately nine times as much power to the 45° beam as is supplied to the 0° beam to provide a resultant phase progression of 35°, and supplying approximately nine times as much power to the −45° beam as is supplied to the 0° beam to provide a resultant phase progression of −35°.

4. An antenna array matrix for simultaneously providing multiple beams, said matrix comprising:

(a) a Butler matrix having $3^m \cdot 2^n$ input ports and $3^m \cdot 2^n$ output ports, where m and n are any whole positive integer either of which may include zero;

(b) phase shifting means connected to the $3^m \cdot 2^n$ output ports of said Butler matrix for introducing a phase shift in a fixed phase progression of approximately 180° divided by the number of output ports;

(c) means for combining the $3^m \cdot 2^n$ input ports for providing resultant output beams that have an amplitude taper resulting in a predetermined amplitude of sidelobes with approximately a maximization of efficiency.

5. An antenna array matrix as claimed in claim 4 wherein the matrix includes at least 8 input and output ports, the sidelobe level is at least 15 dB down and the input ports are combined to produce beams positioned at approximately ±11.25° and ±33.75° with antenna elements spaced λ/2 apart.

6. An antenna array matrix as claimed in claim 4 wherein the Butler matrix and the combining means include 4 port quadrature couplers.

7. An antenna array matrix as claimed in claim 4 wherein the combining means includes an additional row of couplers combining adjacent beams with unequal amounts of power.

8. An antenna array matrix as claimed in claim 7 wherein the antenna array matrix is formed as a four layer strip line assembly.

9. An antenna array matrix as claimed in claim 8 wherein the phase shifting means includes a differential line length between quadrature couplers for providing the required phase shift.

10. An antenna array matrix for simultaneously providing multiple beams, said matrix comprising a Butler matrix having at least 3 input ports and a similar number of output ports, said Butler matrix including at least one six port junction with first and second 3 dB quadrature couplers, a 4.78 dB quadrature coupler, and fixed 90° phase shift means, one output port of said first 3 dB coupler being coupled to an input port of said second 3 dB coupler through said 90° phase shift means, one output port of said first 3 dB coupler being coupled to an input port of said 4.78 dB coupler, one output port of said 4.78 dB coupler being coupled to a second input port of said second 3 dB coupler, one output port of said second 3 db coupler forming an output port of said six port junction, a second output port of said second 3 dB coupler forming a second output port of said six port junction, and a second output port of said 4.78 dB coupler forming the third output port of said six port junction.

11. An antenna array matrix comprising a two dimensional six port junction including first and second 3 dB quadrature couplers and a 4.78 db quadrature coupler connected by means of phase shifting lines to provide a 120° phase progression and equal power division.

12. An antenna array matrix as claimed in claim 11 wherein the six port junction is bilateral and the phase shifting lines include a 45° line connected between a port of each of the 3 dB couplers and two ports of the 4.78 dB coupler, and two 105° lines and two 75° lines connected one each to two different ports of each of the 3 dB couplers, respectively.

13. An antenna array matrix as claimed in claim 11 wherein the couplers are parallel line couplers and the phase shifting lines include a 90° line connected between a port of each of the 3 dB couplers and two ports of the 4.78 dB coupler, a 30° line connected to a port of each of the 3 dB couplers and two −30° lines connected one each to two ports of the 4.78 dB coupler.

* * * * *